United States Patent

Kitten et al.

Patent Number: 5,875,020
Date of Patent: Feb. 23, 1999

[54] MOTION PICTURE PROJECTION SYSTEM

[76] Inventors: Stephen B. Kitten; Lawrence Polla, Jr., both of 110 Riberia St., St. Augustine, Fla. 32084

[21] Appl. No.: 929,859

[22] Filed: Sep. 15, 1997

[51] Int. Cl.⁶ .................................................. G03B 1/24
[52] U.S. Cl. .......................................... 352/187; 352/190
[58] Field of Search .............................. 352/166, 174, 352/184, 187, 188, 189, 190

[56] References Cited

U.S. PATENT DOCUMENTS

| | | | |
|---|---|---|---|
| 1,315,335 | 9/1919 | Wenderhold | 352/166 |
| 3,303,981 | 2/1967 | Wiese | 226/56 |
| 3,408,144 | 10/1968 | Cowan, Jr. | 352/184 |
| 3,494,524 | 2/1970 | Jones | 226/4 |
| 3,696,982 | 10/1972 | Gottschall | 352/174 |
| 3,730,616 | 5/1973 | Fliesser | 352/166 |
| 3,937,378 | 2/1976 | Kopernicky | 226/55 |
| 4,022,525 | 5/1977 | Boudouris | 352/187 |
| 4,150,886 | 4/1979 | Merkel et al. | 352/166 |
| 4,253,749 | 3/1981 | Boudouris | 352/187 |
| 4,537,482 | 8/1985 | Weiner | 352/186 |
| 5,266,979 | 11/1993 | Brown et al. | 352/187 |

FOREIGN PATENT DOCUMENTS 3324911   1/1985   Germany .

*Primary Examiner*—Russell Adams
*Attorney, Agent, or Firm*—Edward M. Livingston, Esq.

[57] ABSTRACT

A motion-picture-projection system has a top intermittent sprocket (1) and a bottom intermittent sprocket (6) that are rotated intermittently in unison by mechanical and/or electrical means (8, 9, 19, 20, 21, 22, 23, 24) for conveyance of film (3) through a film gate (4) without formation of loops of film between the top intermittent sprocket and the film-gate outlet sprocket. To compensate for differences of length of unreeled film due to its cyclic advance and film-frame stoppage, compensatory loops (16, 17) are formed prior to instead of after a top intermittent sprocket and after instead of before a film-gate outlet sprocket. A film-contact surface (25, 26) of a film gate is arcuate and bordered with non-abrasive and suitably pliable material to minimize film wear. Air can be pumped onto the film for cooling and for distortion contamination resulting from heat absorption formation that is related to film "breathing". Electronic monitoring of film speed, frame-dwell time, heat, light, film noise, film flutters, film condition, compensatory-loop conditions, equipment functioning, equipment condition and other projection aspects with optionally automatic warnings, operational adjustments and electrical shutdown are provided. A use method is described.

23 Claims, 2 Drawing Sheets

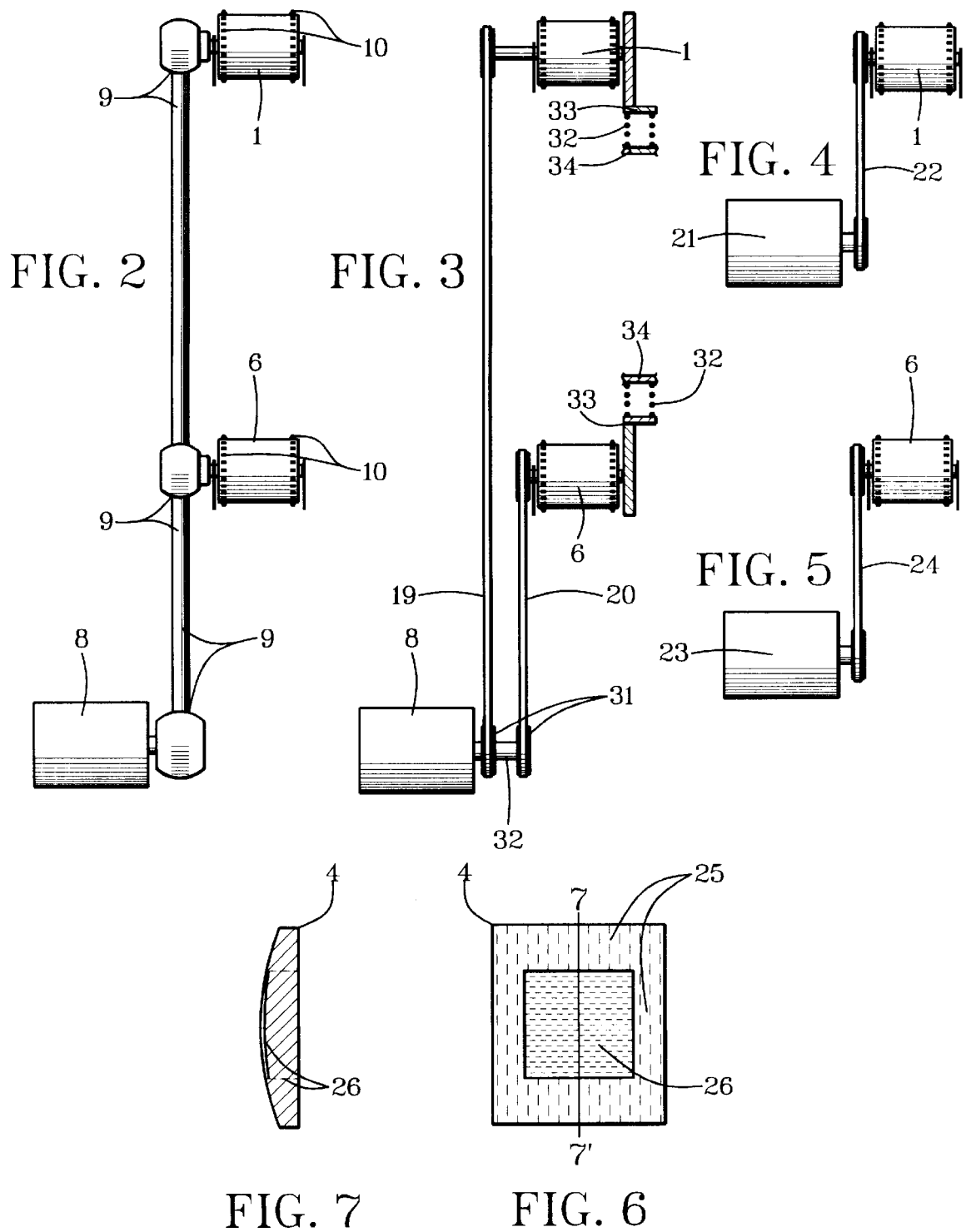

MOTION PICTURE PROJECTION SYSTEM

BACKGROUND OF THE INVENTION

This invention relates to motion-picture projectors and more particularly to dual-sprocket rotation for conveying film through a projector at high speeds with proportionately long-enduring stops intermittently at film gates without flutter, wear or noise of film in intermittent motion and without damage or danger from malfunction of the projection system.

Currently, film projectors employ various types of film looping between input and take-up reels when film is being conveyed intermittently through film gates. Film gates are known also as light gates but will be referred to as film gates for consistency in this document. Film loops in conventional systems compensate for rapid changes of un-reeled length of film above and below a film gate as a result of timed stops of the film at the film gates between evenly synchronized input and take-up of the film by the respective reels. Traditional film projection systems have only a bottom film-transport wheel, called a bottom intermittent sprocket, which pulls the film through a film gate. Unfortunately, such traditional systems require high friction at the film gates to prevent the film from over shooting the film trap.

A variety of prior-art means and methods have been employed to control but not to eliminate film looping between top and bottom sprockets while also eliminating detrimental flutter, wear, noise, damage and danger from operation of a projection machine as taught by this invention.

Examples of different but related projection systems and methods are described in the following patent documents. U.S. Pat. No. 3,303,981, issued to Wiese, described top and bottom film sprockets that were rotated simultaneously in order to drive film through a film gate in the most nearly similar manner in relation to some aspects of this invention that is known. It was limited, however, to a fixed frame 11 that functioned in relation to a moveable frame 12 with a complex indexing means that generated and controlled a relatively small loop that was, nevertheless, a "film-gate loop" between top and bottom film sprockets 13 and 14. Instead of eliminating the film-gate loop with better means and methods, it attempted to minimize the problem in ways that perpetuated its basically detrimental features and taught against a thorough solution that is made possible by this invention.

Two U.S. Pat. Nos. 4,022,525 and 4,253,749, issued to Boudouris, also perpetuated means and methods for forming a film-gate loop between top and bottom film-conveyance sprockets. The '749 Boudouris patent provided for forming a looped film at a distance from a surface of a film gate. This "distance looping" was a prior-art continuation of the film-loop problem that apparently was recognized and attempted to be solved by an indexing system that was similar in principle to the above Wiese patent. The '525 Boudouris patent had larger film-loop problems that were diminished but not eliminated by the latter '749 Boudouris patent.

Other known projection systems are further yet different but pertinent to understanding the significance of this invention. U.S. Pat. No. 4,537,482, issued to Weiner, taught a barrel cam for intermittent transfer of film-gate sections of film between top and bottom film loops. German Application Number DE 3324-911-A, by Thiele, taught a controlled-motorization means between top and bottom film loops. U.S. Pat. No. 4,150,886, issued to Merkel, et al., taught a double-sided gear-belt drive of film-gate sections of film between film loops that were regulated loosely by top and bottom capstan gearing. U.S. Pat. No. 3,937,378, issued to Kopernicky, described detent control of film loop. U.S. Pat. No. 3,494,524, issued to Jones, taught a circumferential loop-control mechanism.

Contrary to the prior art, the present invention provides precision film placement in the film gate by using two synchronized film sprockets that accelerate and decelerate simultaneously. Thus, each frame of film is accurately placed in the same position as the previous frame.

On the other hand, prior art projection systems use pressure friction and registration pins or loops through the film gate assembly to perform this task. Such friction must be overcome to pull the next frame into position. Although the latter friction use may work satisfactorily with 35 millimeter film, it does not work well with larger film stocks and frame sizes, as the friction which is used and must be overcome increases logarithmically. The increased film mass and surface friction requires large film movements and results in increased mechanical failure and film wear.

The present invention eliminates the need to use friction by having a deceleration sprocket before the film gate which also eliminates any slack in the film so the film cannot flutter or jump.

SUMMARY OF THE INVENTION

In light of need for improvement of film projectors, objects of this invention are to provide a motion-picture-projection system which:

Eliminates film-gate loop of film between top feed sprockets and the intermittent sprockets;

Prevents the overshooting of film through the film gate by controlled deceleration of the film without using friction or registration pins;

Eliminates significant flutter, movement noise, heat generated "breathing" and wear of film from conveyance when the film is decelerated and thus stopped in the film gate;

Avoids damage and danger associated with malfunctioning of projection equipment;

Allows use of a wider range of film speeds without picture distortion or film damage due to either accelerated or decelerated rates of film conveyance either forwards or backwards through film gates; and Allows use of wider film that requires rates of picture-frame cycling equal to smaller film for similar motion-picture effects and, therefore, requires higher film-travel speeds that are made possible by this invention.

This invention accomplishes these and other objectives with a motion-picture-projection system having a film-gate-inlet sprocket and a film-gate-outlet sprocket that are rotated intermittently in unison by mechanical and/or electrical means for conveyance of film through a film gate without formation of intermediate loops of film between the film-gate-inlet sprocket and the film-gate outlet sprocket. Absence of intermediate loops allows absolute control of film in order to avoid film flutter, inaccurate positioning of picture frames and other problems associated with conventional film looping. To compensate for differences of length of unreeled film due to its cyclic advance and film-frame stoppage, compensatory loops are formed prior to instead of after a film-gate-inlet sprocket and after instead of before a film-gate outlet sprocket. Projection intensity of light at the film gate can be directed by a mirror through a dichroic infrared heat filter to prevent transmission of infrared heat energy from a light source to a projection mechanism at the film gate. A film-contact surface of the film gate can be arcuate and covered at least at film edges with non-abrasive and suitably pliable material to minimize film wear. Compressed air can be directed onto the film for cooling and for preventing distortion resulting from heat absorption that is related to film "breathing". Electronic monitoring of film speed, frame-dwell time, heat, light, film noise, film flutter, film condition, compensatory-loop conditions, equipment functioning, equipment condition and other projection aspects with automatic warnings and operational adjustments can be provided.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

This invention is described by appended claims in relation to description of a preferred embodiment with reference to the following drawings which are referred to as FIGS. in this document and described briefly as follows:

FIG. 2 is a side elevation view of a sequentially controlled dual-sprocket intermittent with shaft-geared rotation of a film-gate-inlet sprocket and a film-gate-outlet sprocket rising a Geneva dual drive movement;

FIG. 3 is a side elevation view of a sequentially controlled dual-sprocket intermittent with gear-belt rotation of a film-gate-inlet sprocket and a film-gate-outlet sprocket;

FIG. 4 is a side elevation view of a first of two sequentially controlled motors of a dual-sprocket intermittent with gear-belt rotation of a film-gate-inlet sprocket;

FIG. 5 is a side elevation view of a second of two sequentially controlled motors of a dual-sprocket rotator with gear-belt rotation of a film-gate-outlet sprocket, FIG. 6 is a front elevation view of a film-gate lens having a film-steadying surface; and FIG. 7 is a cross-sectional view of the FIG. 6 illustration through section line 7–7' of FIG. 6.

DESCRIPTION OF PREFERRED EMBODIMENT

Figure 1:
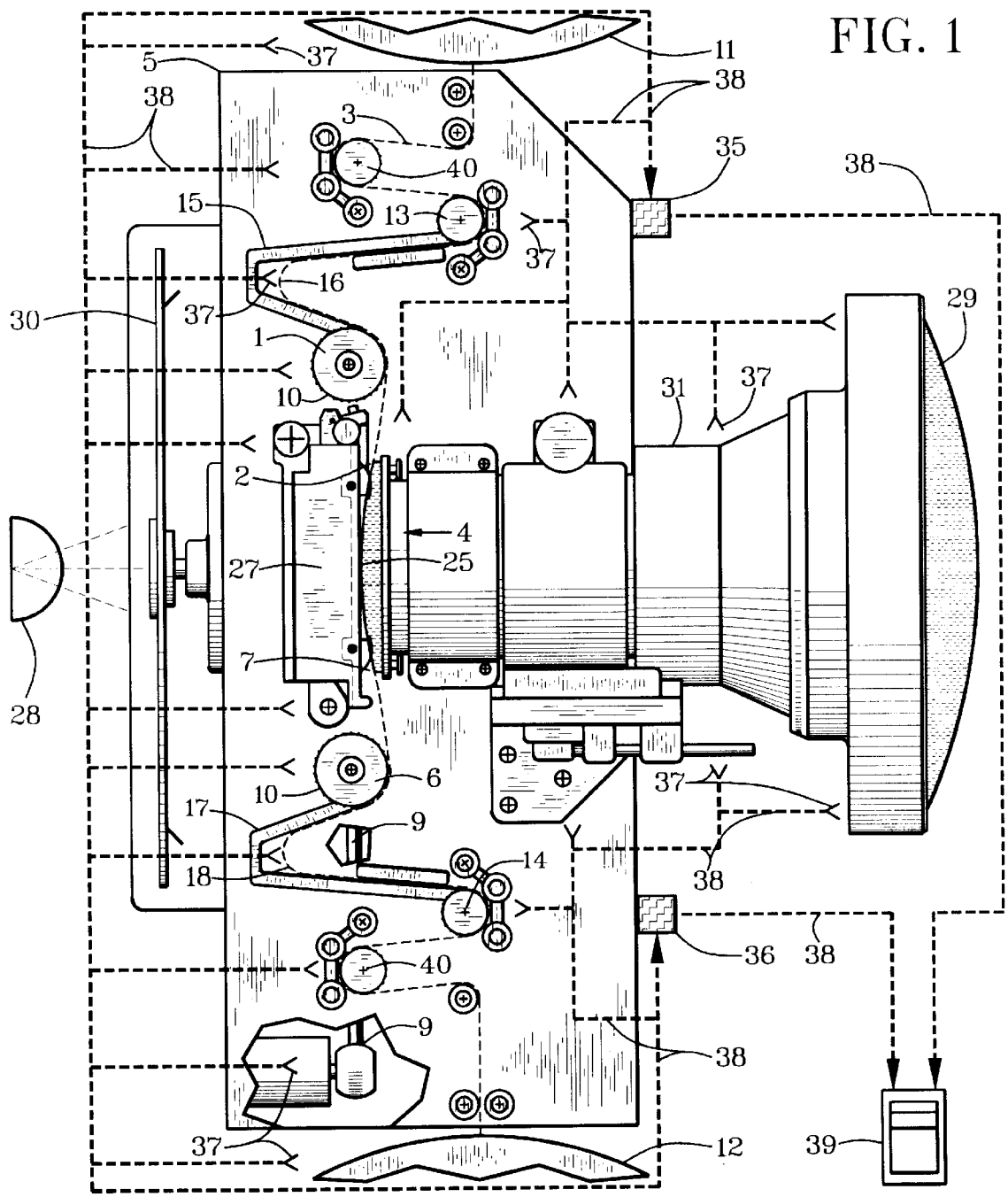
FIG. 1 is a partially cutaway side elevation view of a film projector of the invention.

Terms used to describe features of this invention are listed below with numbering in the order of their initial use with reference to the drawings. These terms and numbers assigned to them designate the same features wherever used throughout this description.

1. Top intermittent sprocket
2. Film-gate inlet
3. Film
4. Film gate
5. Motion-picture projector
6. Bottom intermittent sprocket
7. Film-gate outlet
8. Sequentially controlled electrical motor
9. Gear drivetrain
10. Sprocket teeth
11. Film-input reel
12. Film-output reel
13. Feed sprocket
14. Hold-back sprocket
15. Input-loop controller
16. Input loop
17. Output-loop controller
18. Output loop
19. First gear belt
20. Second gear belt
21. First dual motor
22. First-motor gear belt
23. Second dual motor
24. Second-motor gear belt
25. Film-contact surface
26. Projection portion
27. Film trap
28. Projection light
29. Projection lens
30. Standard shutter
31. Infrared heat filter
32. Sprocket spring
33. Sprocket base
34. Frame base
35. Upper optical encoder
36. Lower optical encoder
37. Detectors
38. Communication lines
39. Power-source switch
40. Encoder sprockets Reference is made to the drawing figures. A top intermittent sprocket 1 is positioned proximate a film-gate inlet 2 of film 3 to a film gate 4 of a motion-picture projector 5. Oppositely disposed, a bottom intermittent sprocket 6 is positioned proximate a film-gate outlet 7 of the film 3 from the film gate 4. A dual-sprocket intermittent rotator, such as a sequentially controlled electrical motor 8 with a gear drivetrain 9 to both the top intermittent sprocket 1 and the bottom intermittent sprocket 6, has rotational actuation with intermittent stoppage of the top intermittent sprocket 1 simultaneously with rotational actuation with intermittent stoppage of the bottom intermittent sprocket 6.

Sprocket teeth 10 are extended radially from ends of a circumferential periphery of the top intermittent sprocket 1 to engage sprocket-drive apertures in film 3 being unwound from a film-input reel 11. Similarly, sprocket teeth 10 are extended radially from ends of a circumferential periphery of the bottom intermittent sprocket 6 to engage sprocket-drive apertures in film 3 being wound onto a film-take-up reel 12.

The dual-sprocket rotator, such as sequentially controlled electrical motor 8, has film-advancement rotation cyclically alternate from frame-projection stoppage of the film 3 in the film gate 4 for a select time of frame-projection stoppage in proportion to film-advancement rotation of the film 3 frame-by-frame. A feed sprocket 13 is positioned intermediate the film-input reel 11 and the top intermittent sprocket 1, the feed sprocket 13 being actuated to unwind film 3 from the film-input reel 11 at a select rate prior to cyclically rotational actuation of the film 3 with the top intermittent sprocket 1. In opposite working relationships a hold-back sprocket 14 is positioned intermediate the bottom intermittent sprocket 6 and the film-take-up reel 12, the hold-back sprocket 14 being actuated to wind film 3 at a select rate after cyclically rotational actuation of the film 3 with the bottom intermittent sprocket 6. Other film transport systems may be used in place of reels.

Intermediate the feed sprocket 13 and the top intermittent sprocket 1 is an input-loop controller 15 which confines an input loop 16 in a V-route with noise-suppressant material that has solid viscosity in relationship to sliding contact of the film 3. Intermediate the hold-back sprocket 14 and the bottom intermittent sprocket 6 is an output-loop controller 17 which confines an output loop 18 in a V-route with noise-suppressant material that has solid viscosity in relationship to sliding contact of the film 3.

Instead of minimally controlled film looping at both sides of a film gate 4 between top and bottom "intermittents" as in conventional practice, there is no film looping between a top intermittent sprocket 1 and a bottom intermittent sprocket 6 that replace the conventional intermittents at opposite sides of the film gate 4. Rather, to compensate for rapid changes of film length between the film-input reel 11 and the film-take-up reel 12 resulting from intermittent or cyclical stoppage and advancement of film 3, there is controlled and noise-suppressed film looping that is isolated from the film gate 4. There is no uncontrolled movement of film 3 at opposite sides of the film gate 4 where it now affects quality of motion-picture projection adversely in conventional practice.

Dual-sprocket rotation can be achieved with a selection of dual-sprocket rotators. FIG. 2 illustrates a Geneva dual-sprocket intermittent rotator that is the sequentially controlled electrical motor 8 with a gear drivetrain 9 in rotative communication with a top intermittent sprocket 1 and a bottom intermittent sprocket 6, in Geneva intermittent movements.

FIG. 3 depicts a dual-sprocket rotator that is the sequentially controlled electrical motor 8 with a first gear belt 19 driving a top intermittent sprocket 1 and a second gear belt 20 driving a bottom intermittent sprocket 6.

FIGS. 4–5 depict a dual-sprocket rotator that is a first dual motor 21 that is sequentially controlled and has a first-motor gear belt 22 which drives a top intermittent sprocket 1 and a second dual motor 23 that also is sequentially controlled and has a second-motor gear belt 24 which drives a bottom intermittent sprocket 6.

Mechanical gearing for the dual-sprocket rotator includes metal gearing, gear-belt gearing and direct drive from a sequentially controlled electrical motor 8 or other source of rotative power. A sequentially controlled electrical motor 8 can be referred to also as a step motor of a particular variety that provides precisely controlled stopping and starting. Cyclic stopping and starting of rotation by a dual-sprocket rotator can be provided also by select mechanical means in working relationship with continuous rotation of an electrical motor or other rotational power source.

Referring to FIGS. 6–7 and referring further to FIG. 1 also, the film gate 4 has a light side that is arcuate or curved with a film-contact surface 25. The film-contact surface 25 borders a projection portion 26 and has solid-lubricant viscosity to sliding contact of the film 3. The projection portion 26 is optimized for picture projection and the film-contact portion 25 is optimized for sliding contact of film 3 and for standardization.

Aiding further in stabilizing film 3 at the film gate 4 is a film trap 27 into which air is directed from an externally positioned conventional air pump against a light side of film 3 intermediate a projection light 28 and the film gate 4. The air cools the film gate 4, the film 3 and a projection lens 29 to aid picture projection in addition to stabilizing the film 3 against the film gate 4.

The projection light 28 is directed intermittently through a standard shutter 30, through the film 3, through a dichroic infrared heat filter 31, to the projection lens 29 and onto a screen.

Motors 8, 21, and 23 provided to rotate the top intermittent film-gate-inlet-sprocket 1, the bottom intermittent film-gate-inlet sprocket 6, the feed sprocket 13 and the hold-back sprocket 14 respectively with associated mechanical means are reversible in direction of rotation and variable selectively in speed of rotation.

Referring further to FIG. 3, an alternative for aiding stabilization of film 3 is tightening it against the film gate 4 with sprocket springs 32 between a sprocket base 33 and a frame base 34 to spring-pressure the top intermittent sprocket 1 and the bottom intermittent sprocket 6 apart with relatively light pressure. This can be accomplished for either type of sprocket mounting or dual-sprocket rotator.

An electronic monitor has electrical-shutdown communication with the motion-picture-projection system in response to select signals and predetermined conditions. The electronic monitor has an upper optical encoder 35 and a lower optical encoder 36 through which select physical conditions related to operation are detected by optimally positioned detectors 37 and communicated through communication lines 38 to a power-source switch 39 for electrical shutdown in accordance with predetermined factors at an input side and at an output side of the projection system. The detectors 37 and the communication line 38 are representative of electrical, fibre-optical and/or radio-wave communication selectively. Encoder sprockets 40 are employed to aid electronic monitoring.

A new and useful motion-picture-projection system having been described, all such foreseeable modifications, adaptations, substitutions of equivalents, mathematical possibilities of combinations of parts, pluralities of parts, applications and forms thereof as described by the following claims and not precluded by prior art are included in this invention.

What is claimed is:

1. A motion-picture-projection system comprising:

a top intermittent sprocket positioned proximate a film-gate inlet of film to a film gate of a motion-picture projector;

a film-gate outlet sprocket positioned proximate a film-gate outlet of film from the film gate of the motion-picture projector;

a dual-sprocket rotator having rotational actuation with intermittent stoppage of the top intermittent sprocket simultaneously with rotational actuation with intermittent stoppage of the bottom intermittent sprocket;

film-gate-inlet-sprocket teeth extended radially from ends of a circumferential periphery of the top intermittent sprocket to engage sprocket-drive apertures in film being unwound from a film-input reel;

film-gate-outlet-sprocket teeth extended radially from ends of a circumferential periphery of the bottom intermittent sprocket to engage sprocket-drive apertures in film being wound onto a film-take-up reel;

the dual-sprocket rotator having film-advancement rotation cyclically alternate from frame-projection stoppage of the film in the film gate for a select time of frame-projection stoppage in proportion to time of film-advancement rotation of the film frame-by-frame;

a feed sprocket positioned intermediate the film-input reel and the top intermittent sprocket;

the feed sprocket being actuated to unwind film from the film-input reel at a select rate prior to cyclically rotational actuation of the film with the top intermittent sprocket;

a hold-back sprocket positioned intermediate the bottom intermittent sprocket and the film-take-up reel;

the hold-back sprocket being actuated to wind film at a select rate after cyclically rotational actuation of the film with the bottom intermittent sprocket;

an input-loop controller positioned intermediate the feed sprocket and the top intermittent sprocket; and an output-loop controller positioned intermediate the top intermittent sprocket and the hold-back sprocket.

2. A motion-picture-projection system as described in claim 1 wherein:

the dual-sprocket rotator is a single sequentially controlled electrical motor having mechanical gearing in rotational communication with a shaft of the top intermittent sprocket and with a shaft of the bottom intermittent sprocket, such that rotation for film advancement and stoppage of rotation for picture-frame projection are transmitted equally and simultaneously from the sequentially controlled electrical motor to the top intermittent sprocket and to the bottom intermittent sprocket.

3. A motion-picture-projection system as described in claim 1 wherein:

the dual-sprocket rotator is a first sequentially controlled electrical motor leaving mechanical gearing in rotational communication with a shaft of the top intermittent sprocket and a second sequentially controlled electrical motor having mechanical gearing in rotational communication with a shaft of the bottom intermittent sprocket, and the first sequentially controlled electrical motor and the second sequentially controlled electrical motor are controlled selectively for selectively equal operation, such that the top intermittent sprocket and the bottom intermittent sprocket are rotated and stopped selectively in unison.

4. A motion-picture-projection system as described in claim 1 wherein:

the input-loop controller is a film-input chute having a generally V-shaped rotate intermediate the feed sprocket and the film-gate inlet sprocket; and the output-loop controller is a film-output chute having a generally V-shaped route intermediate the bottom intermittent sprocket and the hold-back sprocket.

5. A motion-picture-projection system as described in claim 4 wherein:

the film-input chute and the film-output chute have film-contact surfaces with sliding viscosity and noise-suppressing effects on film in compensating film loops formed in the film-input chute and the film-output chute respectively; and chute walls are positioned on sides of the input-loop controller and the output-loop controller.

6. A motion-picture-projection system comprising:

a top intermittent sprocket positioned proximate a film-gate inlet of film to a film gate of a motion-picture projector;

a bottom intermittent sprocket positioned proximate a film-gate outlet of film from the film gate of the motion-picture projector;

a dual-sprocket rotator having rotational actuation with intermittent stoppage of the top intermittent sprocket simultaneously with rotational actuation with intermittent stoppage of the bottom intermittent sprocket;

film-gate-inlet-sprocket teeth extended radially from a circumferential periphery of the top intermittent sprocket to engage sprocket-drive apertures in film being unwound from a film-input reel;

film-gate-outlet-sprocket teeth extended radially from a circumferential periphery of the bottom intermittent sprocket to engage sprocket-drive apertures in film being wound onto a film-take-up reel;

the dual-sprocket rotator having film-advancement rotation cyclically alternate from frame-projection stoppage of the film in the film gate for a select time of frame-projection stoppage in proportion to time of film-advancement rotation of the film frame-by-frame;

a feed sprocket positioned intermediate the film-input reel and the top intermittent sprocket;

the feed sprocket being actuated to unwind film from the film-input reel at a select rate prior to cyclically rotational actuation of the film with the top intermittent sprocket;

a hold-back sprocket positioned intermediate the bottom intermittent sprocket and the film-take-up reel;

the hold-back sprocket being actuated to wind film at a select rate after cyclically rotational actuation of the film with the bottom intermittent sprocket;

an input-loop controller positioned intermediate the film-input sprocket and the feed sprocket;

an output-loop controller positioned intermediate the film-output sprocket and the hold-back sprocket;

at least one film-steadying surface on the film gate in film-steadying contact with film at least during frame-projection stoppage of the film in the film gate;

a modulated projection light in light communication intermediate a light-source side of the film gate and a projection side of the film gate;

a shutter positioned proximate the light source of the film gate; and the top intermittent sprocket proximate the film-gate inlet and the bottom intermittent sprocket proximate the film-gate outlet being positioned a distance apart to support a constant length of film without a loop in film intermediate the top intermittent sprocket and the bottom intermittent sprocket.

7. A motion-picture-projection system as described in claim 6 wherein:

the film-steadying surface on the film gate is arcuate intermediate the film-gate inlet and the film-gate outlet, and a select portion of the film-steadying surface on the film gate being positioned in sliding contact with the film advancing through the film gate.

8. A motion-picture-projection system as described in claim 6 wherein:

the film-steadying surface on the film gate that is positioned in sliding contact with film advancing through the film gate and stopping in the film gate includes outside edges of the projection lens of the film gate where sides of picture frames proximate the sprocket-drive apertures are positioned in alternately sliding and stoppage contact with the film gate.

9. A motion-picture-projection system as described in claim 8 wherein:

the outside edges of the film gate border a picture-projection portion of the film gate.

10. A motion-picture-projection system as described in claim 9 wherein:

the outside edges of the film gate have design viscosity in relation to sliding contact with the film.

11. A motion-picture-projection system as described in claim 10 wherein:

shape of the film gate intermediate outside edges which border the picture-projection portion is optimized for picture projection independently of optimization of the outside edges of the film gate for sliding contact with the film.

12. A motion-picture-projection system as described in claim 6 wherein:

the modulated projection light is directed by a mirror through a dichroic infrared heat filter to prevent transmission of infrared heat energy from a light source to a projection mechanism on the film gate.

13. A motion-picture-projection system as described in claim 12 wherein:

the projection mechanism on the film gate is a film aperture which is located in a center of the film gate and a projection lens of a design focal length for a viewing-screen size.

14. A motion-picture-projection system as described in claim 6 and further comprising:

a film trap on a projection side of the film gate;

the film trap being sized, structured and positioned to contain air pumped to the film trap for air-pressured closeness of sliding contact of film with the projection lens of the film gate;

an air pump positioned to direct an output of airflow onto a projection side of film in the film gate for stabilization of the film against a projection side of the film gate and for cooling the film through a projection-side aperture in the film trap.

15. A motion-picture-projection system as described in claim 6 wherein:

motors provided to rotate the top intermittent sprocket, the bottom intermittent sprocket, a feed sprocket and a hold-back sprocket in working relationship with associated mechanical means are reversible in direction of rotation and variable selectively in speed or rotation.

16. A motion-picture-projection system as described in claim 6 and further comprising:

a film-hold-back intermediate the top intermittent sprocket and the film gate to hold back film with designedly slight pressure to force the film against a film gate.

17. A motion-picture-projection system as described in claim 6 and further comprising:

an electronic monitor having electrical-shutdown communication with the motion-picture-projection system in response to select signals.

18. A motion-picture-projection system as described in claim 17 wherein:

the electronic monitor has an upper optical encoder and a lower optical encoder through which select physical conditions related to operation of the motion-picture-projection system are detected by monitoring-positioned detectors and communicated through lines to a power-source controller for electrical shutdown in accordance with predetermined operating conditions at an input side and at an output side of the film gate.

19. A method comprising the following steps for controlling film without film looping between input and output film sprockets in intermittent advancement and stoppage of the film for picture projection in frame-to-frame travel through a film gate of a motion-picture projector:

providing a motion-picture projector with a dual-sprocket intermittent rotator having film-travel advancement and picture-projection stoppage of film-gate-inlet and bottom intermittent sprockets simultaneously;

providing an inlet-loop controller intermediate a feed sprocket from a film-input reel and a top intermittent sprocket;

providing an outlet-loop controller intermediate a bottom intermittent sprocket and a hold-back sprocket for a film-take-up reel;

positioning film intermediate the top intermittent sprocket and the bottom intermittent sprocket without film looping intermediate a film gate and a film-gate sprocket at inlet and outlet sides of the film gate;

positioning film in the inlet-loop controller intermediate the feed sprocket and the top intermittent sprocket;

positioning film in the outlet-loop controller intermediate the bottom intermittent sprocket and the feed sprocket; and operating the motion-picture projector.

20. A method as described in claim 19 and further comprising:

providing an arcuate film-steadying surface on a film gate; and positioning film in viscose sliding contact with the arcuate film-steadying surface of the film gate.

21. A method as described in claim 19 and further comprising:

projecting light mirrored through a dichroic infrared heat filter to an image-transmitting portion of the light gate to minimize transmittal of infrared heat energy to the film gate.

22. A method as described in claim 19 and further comprising:

pumping air against a projection side of film in the film gate to aid stabilization of the film in the film gate and to cool the film in the film gate.

23. A method as described in claim 19 and further comprising:

providing an electronic monitor with communication from monitoring-positioned detectors of select operating conditions of the motion-picture projector to upper and lower optical encoders that encode operating conditions of the motion-picture projector for electrical shutdown communication to an electrical power source in accordance with predetermined conditions.

* * * * *